US006961890B2

(12) United States Patent
Smith

(10) Patent No.: US 6,961,890 B2
(45) Date of Patent: Nov. 1, 2005

(54) DYNAMIC VARIABLE-LENGTH ERROR CORRECTION CODE

(75) Inventor: Kenneth Kay Smith, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 426 days.

(21) Appl. No.: 09/931,776

(22) Filed: Aug. 16, 2001

(65) Prior Publication Data

US 2003/0037299 A1  Feb. 20, 2003

(51) Int. Cl.[7] .............................................. G11C 29/00
(52) U.S. Cl. ...................................... 714/763; 714/718
(58) Field of Search ................................. 714/774, 718, 714/763

(56) References Cited

U.S. PATENT DOCUMENTS

| | | | | |
|---|---|---|---|---|
| 4,701,923 A | * | 10/1987 | Fukasawa et al. | 714/774 |
| 5,600,663 A | * | 2/1997 | Ayanoglu et al. | 714/774 |
| 5,699,365 A | * | 12/1997 | Klayman et al. | 714/774 |
| 5,872,770 A | * | 2/1999 | Park et al. | 370/241.1 |
| 5,912,907 A | * | 6/1999 | Stewart | 714/774 |
| 6,477,669 B1 | * | 11/2002 | Agarwal et al. | 714/774 |
| 6,651,213 B2 | * | 11/2003 | Hassner et al. | 714/763 |

OTHER PUBLICATIONS

"Error Coding—4 Properties and performance of polynomial codes," Nov. 2001, pp. 3-4.*

Syed Shahzad Shah, et al., "Self-correcting codes conquer noise Part 2: Reed-Solomon codecs," EDN, Mar. 15, 2001, pp. 107-120.

Syed Shahzad Shah, et al., "Self-correcting codes conquer noise Part one: Viterbi codecs," EDN, Feb. 15, 2001, pp. 131-140.

\* cited by examiner

*Primary Examiner*—Guy Lamarre

(57) ABSTRACT

Data storage media, such as silicon-based non-volatile memory, are configured according to a data structure containing a payload portion and a redundancy portion. A divider segregating the payload and redundancy portions may be dynamically relocated, thereby altering the size of the redundancy to allow for use of an error correcting code selected to provide the data integrity required in response to changing conditions.

23 Claims, 4 Drawing Sheets

DYNAMIC VARIABLE-LENGTH ERROR CORRECTION CODE

TECHNICAL FIELD

This invention relates to a dynamic variable-length error correction code. More particularly, this invention relates to a system and method by which the amount of space devoted to error correction codes can be varied dynamically in response to changes in the storage media.

BACKGROUND

It is common for silicon-based non-volatile memory to employ a data protection strategy by which data errors may be detected, and in some cases, corrected. Conventional data protection strategies protect a data "payload" with an error correction code (ECC) contained within an area known as "redundancy." While redundancy provides for greater data integrity, it also adds overhead, resulting in additional storage costs and additional processor time.

The amount of redundancy required is dependent on the application. Frequently, an 8-bit payload is associated with a one-bit redundancy, or parity bit. Similarly, a larger quantity of information may also be protected. For example, it is common for a payload of 512 bytes to be protected by a redundancy 5% to 20% of that length. Within this context, an efficiency rate may be defined as the data or payload length over the sum of the payload length and the redundancy. An efficiency rate of 80% to 95% is common. Because efficiency rates are significantly less than 100%, it is clear that considerable resources are currently devoted to error detection and correction.

The quantity of resources devoted to redundancy is commonly based on the fundamental error rate of the data storage media. The fundamental error rate of a data storage media is the rate at which errors are found within the media. The fundamental error rate is dependent on a number of factors. For example, the technology type, media age, number of writes/reads and other factors can impact the fundamental error rate. Additionally, a composite memory device, such as a flash card formed from several integrated circuits, can have a complex error rate that reflects the distinct individual rates of each integrated circuit.

The fundamental error rate is particularly dependent upon factors that are a function of time. For example, the fundamental error rate of memory devices based on some technologies may increase over time in response to degradation of an insulation layer. Accordingly, a level of redundancy that is appropriate for the fundamental error rate at the date of manufacture could be inadequate after a period of time. However, a level of redundancy that is appropriate at some date in the future might be excessive during the period of time the device was most likely to be used, immediately following manufacture.

The fundamental error rate may be difficult to determine. A statistically valid sample space of writes and reads may be difficult and expensive to obtain. Also, because the error rate is not constant, data obtained tends to be inconclusive. Due to this uncertainty, and to the cost of data failure in the result of undetected or corrected errors, it is common to estimate the expected error rate, and for excessive redundancy to be devoted to media.

While excessive redundancy is common, it is also possible for insufficient redundancy to be devoted to the detection and correction of errors that do occur. This is particularly the case in storage technologies wherein the error rate is not constant, and increases in the fundamental error rate over time eventually overwhelm the redundancy provided. In such applications, portions of a storage device can be lost that would be functional if additional redundancy were employed.

Accordingly, it would be beneficial to develop a variable-length error correction code and method of use that dynamically alters the redundancy available to allow substitution of a first ECC with a second ECC in response to changing error rates, and which allows more efficient allocation of memory between payload and redundancy.

SUMMARY

Systems and methods for dynamically allocating data storage between payload and redundancy are disclosed. The dynamic reallocation is made in response to changed conditions, and maximizes data integrity and minimizes overhead. In one implementation of the dynamic variable-length error correction code, the allocation between a payload and a redundancy containing an error correction code (ECC) within a storage media is dynamically changed in response to changes in the fundamental error rate of the storage media.

During a process by which storage media is manufactured, regions associated with payload and redundancy are defined within the media. The relative space allocated to redundancy may be based on the technology type, a test of the memory, the use to which the storage device will be put and other factors. An ECC consistent with the error rate of the storage device, and a redundancy having sufficient size to accommodate the ECC, are selected.

During the operation of a device, such as a digital camera, within which the storage media is operational, error tracking is performed to determine if the fundamental error rate has changed. A self-test may perform more extensive testing, with greater statistical accuracy. Media age and use levels are monitored, and correlated with expected degradation rates based on technology type. The use to which the memory is put, such as a camera, an MP3 player or handheld video game player, is monitored.

Where necessary, the relative allocation of space between the payload and redundancy is dynamically adjusted. The space allocated to redundancy may then be associated with an appropriate ECC, selected from among an ECC library that may include parity, BCH (Bose-Chadhuri-Hocquenghem) codes and Reed-Solomon codecs of varying strengths. Different ECC's have relative advantages and disadvantages in terms of the strength of their error detection and correction ability, their memory space requirements and the speed with which the executable program steps associated with the ECC execute.

BRIEF DESCRIPTION OF THE DRAWINGS

The same numbers are used throughout the drawings to reference like features and components.

DETAILED DESCRIPTION

Overview

Data storage media such as silicon-based non-volatile memory are configured according to a data structure that segregates a payload portion and a redundancy portion. A divider segregating the payload and redundancy portions may be dynamically allocated, whereby the size of the redundancy and the strength of an ECC contained within it may be selected appropriately, in response to changing conditions. Different ECC's have relative advantages and disadvantages in terms of the strength of their error detection and correction ability, their memory space requirements and the speed with which the executable program steps associated with the ECC execute.

The redundancy portion of a data structure includes information according to an error correcting code (ECC) that detects, and in some cases corrects, errors in the storage media. In the course of manufacturing data storage media, the technology type, results of testing, and use to which the data storage media is to be put, are considered. In view of these factors, a decision is made as to the strength of the error correcting code required, its space requirements, and therefore the relative sizes of the payload and redundancy.

The memory is then installed for use in a system or device, such as a digital camera. In a typical application, the life cycle of the storage media results in some degradation over time. In response, error detection, recording and analysis are preformed. Media age and use levels are monitored. Memory tests may be run. In response to changes in memory reliability, the size of the redundancy with respect to the payload may be changed, and a more appropriate ECC substituted. This allows the continued reliable operation of the media, and delays the time when bad areas of the media must be mapped out or the media replaced.

Exemplary Redundancy Allocation

Figure 1:
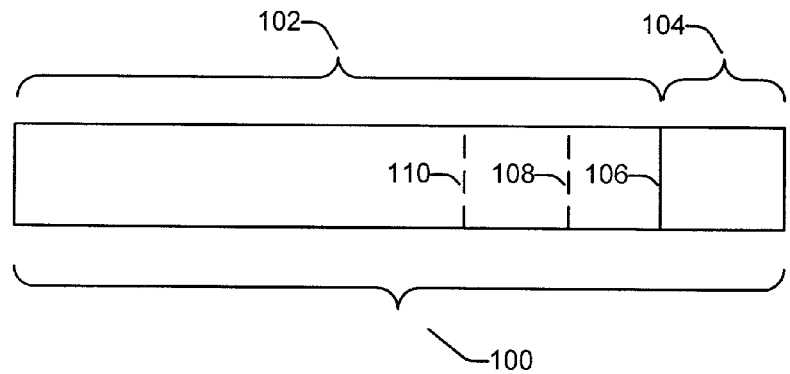
FIG. 1 is an illustration of a simple ECC codeword, having a payload portion and a redundancy portion.

FIG. 1 shows a codeword 100 having a useful data or payload portion 102 and a redundancy portion 104. For example, the payload portion may be an 8-bit data byte, and the redundancy may include one parity bit. Alternatively, the payload and the redundancy could both be formed from larger digital storage areas.

A first divider 106 represents a logical segregation within the codeword 100, between the payload 102 and the redundancy 104. While a variety of relationships between the payload and redundancy are possible, it is illustrative to view divider 106 as segmenting the codeword into a 128-bit payload with an 8-bit parity.

Second and third dividers 108, 110 represent two additional manners in which the payload and redundancy within the ECC codeword could be segregated. Dividers 108, 110 are shown in dotted outline to signify that they are alternates to divider 106, and that at any given time, only one divider is used to logically segregate the payload and the redundancy. It is illustrative to view divider 108 as segmenting the ECC codeword into an 120-bit payload with a redundancy in the form of a 16-bit BCH (Bose-Chadhuri-Hocquenghem) code. It is significant that substitution of the 16-bit BCH code results in a lower "rate," i.e. a lower ratio of payload to payload plus redundancy. However, the stronger BCH code enables the successful use of blocks of storage that might otherwise be unusable due to a higher fundamental error rate.

Similarly, it is illustrative to view divider 110 as segmenting the ECC codeword into a 112-bit payload with a redundancy in the form of a 24-bit Reed-Solomon code. Similarly, the use of a Reed-Solomon code results in a lower rate, but also the ability to provide data integrity within an environment having a higher fundamental error rate.

Figure 2:
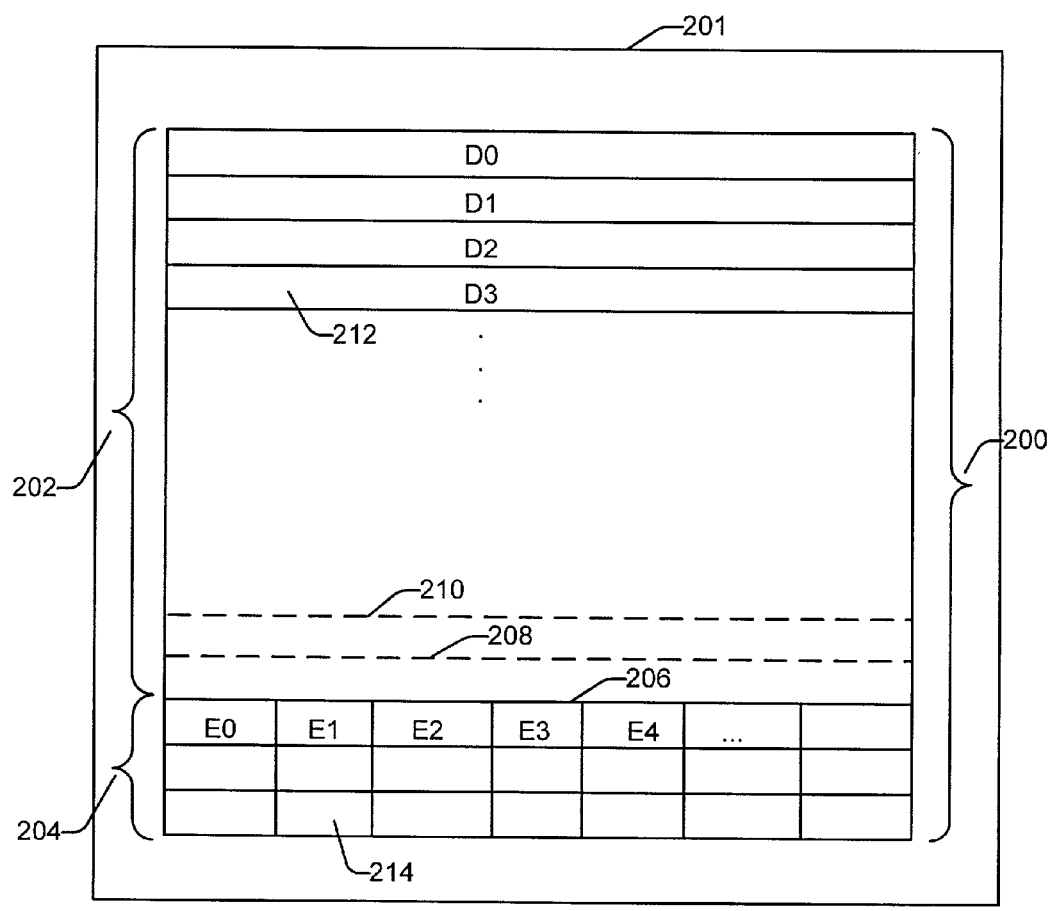
FIG. 2 is an illustration of a data storage device and an associated data structure having a plurality of payload data segments and associated redundancy segments.

FIG. 2 shows a storage map illustrating the logical allocation of a data structure 200 representing memory within a storage device 201. The data structure 200 may be associated with one or more integrated circuits (ICs) or similar monolithic devices, within which it may be reasonable to assume that the fundamental error rate will be generally homogeneous. The data structure 200 includes a data pool or payload 202 and an ECC pool or redundancy 204. A first divider 206 separates the payload and the redundancy. A second divider 208 and a third divider 210 are representative of a plurality of other dividers that could be used to segregate the payload and redundancy in a manner that would change their relative quantities, and therefore the rate. The second and third dividers are shown in dotted outline, to indicate that they are alternatives to the first divider 206, and that only one divider may be used at a given time.

The data pool 202 includes a plurality of data words 212 having a bit length that is typically dependent upon the architecture of the device within which the storage block is defined. In an exemplary addressing scheme, the data words are numbered in sequence, D0, D1, D2, etc, and have a 16-bit, 32-bit, 64-bit or other length.

The redundancy pool 204 includes a plurality of ECC words 214, numbered in sequence E0, E1, E2, etc. Each ECC word is associated with, and provides redundancy for, a corresponding data word 212. Each ECC word is also associated with a particular error correcting code, and the information contained within each ECC word is formulated in accordance with that ECC.

The first divider 206 represents a logical segregation within the block 200, between the payload 202 and the redundancy 204. While a variety of relationships between the payload and redundancy are possible, it is illustrative to view divider 206 as segregating the storage block into a plurality of payload data words D0 . . . Dn, each associated with a redundancy word E0 . . . En. The information associated with the redundancy may include a parity or weak BCH error correction code.

A second divider 208 may be substituted for the first, thereby reducing the number of payload data words in the data pool, and reducing the number and increasing the length of each ECC word devoted to redundancy. Each payload data word Dn continues to be associated with a redundancy word En. However, where the second divider is used in place of the first divider, fewer payload data words are present. As a result, fewer ECC redundancy words, each of greater length, are present. Accordingly, the redundancy may take the form of a stronger BCH error correction code.

A third divider 210 may be substituted, for the second divider, thereby altering the relative amounts of payload and redundancy in a manner which provides additional redundancy and reduces the space devoted to payload. As a result, the redundancy may support very strong Reed-Solomon codecs.

The reader will realize that the dividers are not limited to any particular implementation. Accordingly, moving a divider or substituting one divider for another divider are equivalent, and either implementation may be used for reorganization of the logical relationship between the payload and redundancy. In particular, where the payload and redundancy occupy a region within a storage device, moving the divider would represent a logical shift in the relative address space allocated between the payload and the redundancy. Similarly, replacing a divider with another divider would represent reorganizing the address space shared by the payload and the redundancy, typically so that redundancy information according to a newly selected ECC could fit into the redundancy.

Figure 3:
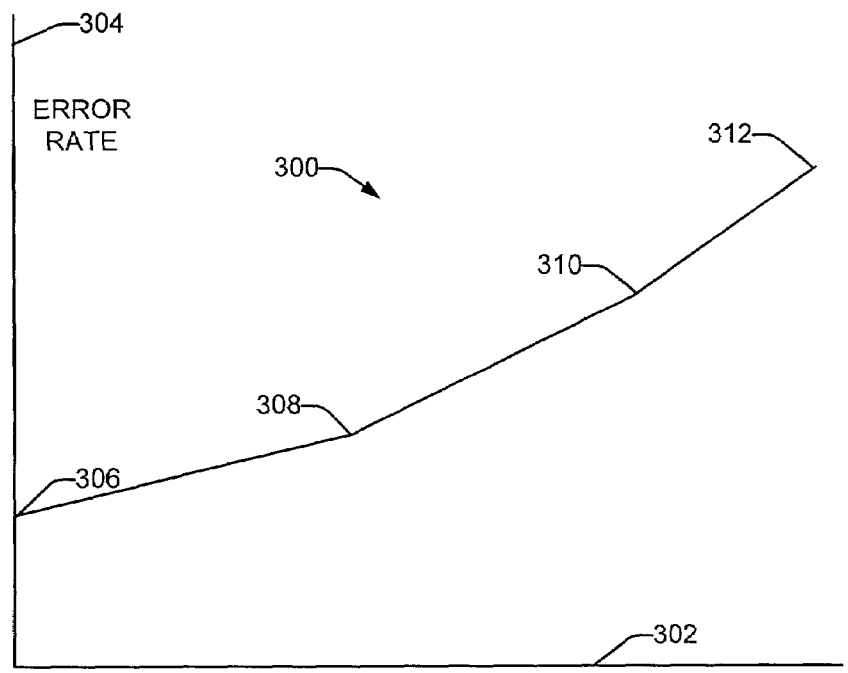
FIG. 3 is a graph illustrating error rate as a function of memory activity.

FIG. 3 shows an exemplary graphical representation of the fundamental error rate 300 of a storage media. A measurement of activity, such as the number of writes and reads or the chronological age of the media, is measured on the horizontal axis 302. The fundamental error rate is represented on the vertical axis 304.

Prior to use, an initial fundamental error rate estimate or measurement 306 is a result of the technology type, the characteristics of a specific storage device and other factors. After a period of activity, a first updated fundamental error rate estimate or measurement 308 indicates that some increase in the error rate has occurred. This may be the result of age and use of the storage media. Second and third updated fundamental error rate estimates or measurements 310, 312 typically indicates that additional degradation of the storage media has occurred. It is generally the case that the fundamental error rate is constant or increasing; it is rarely the case that the rate decreases, although due to the distribution of errors it is possible for sequential measurements to indicate a decrease in the fundamental error rate.

Figure 4:
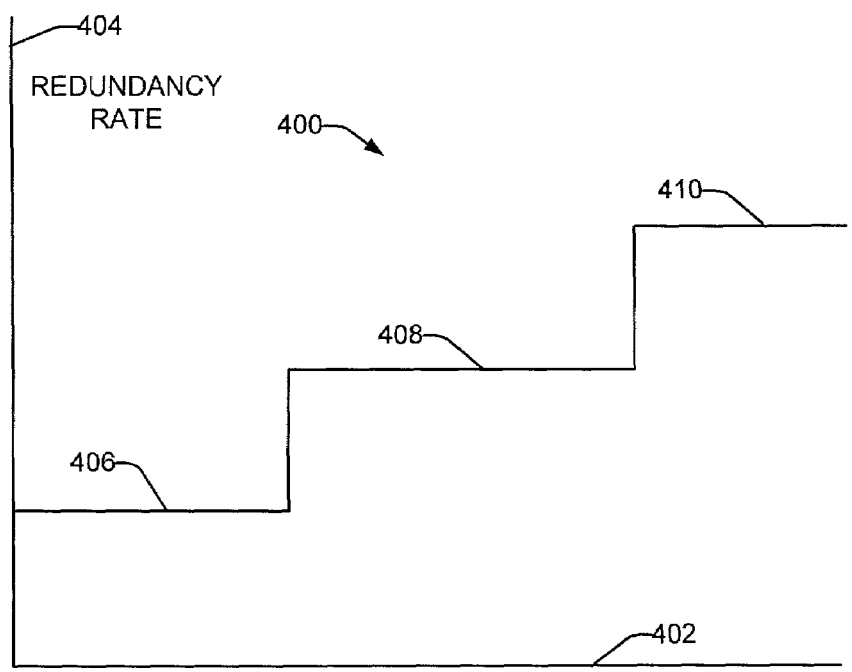
FIG. 4 is a graph illustrating redundancy rate as a function of memory activity.

FIG. 4 shows an exemplary graphical representation of the redundancy rate 400 applied to a data structure 200 in response to the increase in the fundamental error rate 300, as seen in FIG. 3. A measurement of activity, such as the number of writes and reads or the chronological age of the media, is measured on the horizontal axis 402. The redundancy level is represented on the vertical axis 404.

At the time that the fundamental error rate was measured at 306, a first redundancy level 406 is reflected in data structure 200. The redundancy rate 406 may be associated with a divider 206 segregating the block 200 into a payload 202 and a redundancy 204. Where the error rate is relatively low, the level of space assigned to the redundancy may be sufficient even when associated with a parity bit or weak BCH code.

At the time that the fundamental error rate was measured at 308, a second redundancy rate 408 is applied to the data structure 200. The second redundancy rate is associated with a divider 208 segregating the data structure 200 into a payload 202 and a redundancy 204. Due to the increase in the error rate 308 over error rate 306, the space assigned to the second redundancy 408 must be sufficient to contain information according to a stronger BCH code or similar codecs. Referring back to FIG. 2, it can be seen that divider 208 provides a greater percentage of the storage block 200 to redundancy. As a result, the redundancy level 408 is sufficient to support a stronger BCH or similar codecs.

Similarly, at the time that the fundamental error rate was measured at 310, a third redundancy level 410 is applied to the data structure 200. The third redundancy level is associated with a divider 210. Due to the increase in the error rate 310 over error rate 308, the level of space assigned to the redundancy 410 may need to be sufficient for use of a very strong BCH code or Reed-Solomon codecs. Referring back to FIG. 2, it can be seen that divider 210 provides a greater percentage of the storage block 200 to redundancy. As a result, the redundancy level 410 is sufficient to support the very strong BCH and Reed-Solomon codecs.

Exemplary Redundancy Allocation Architecture

Figure 5:
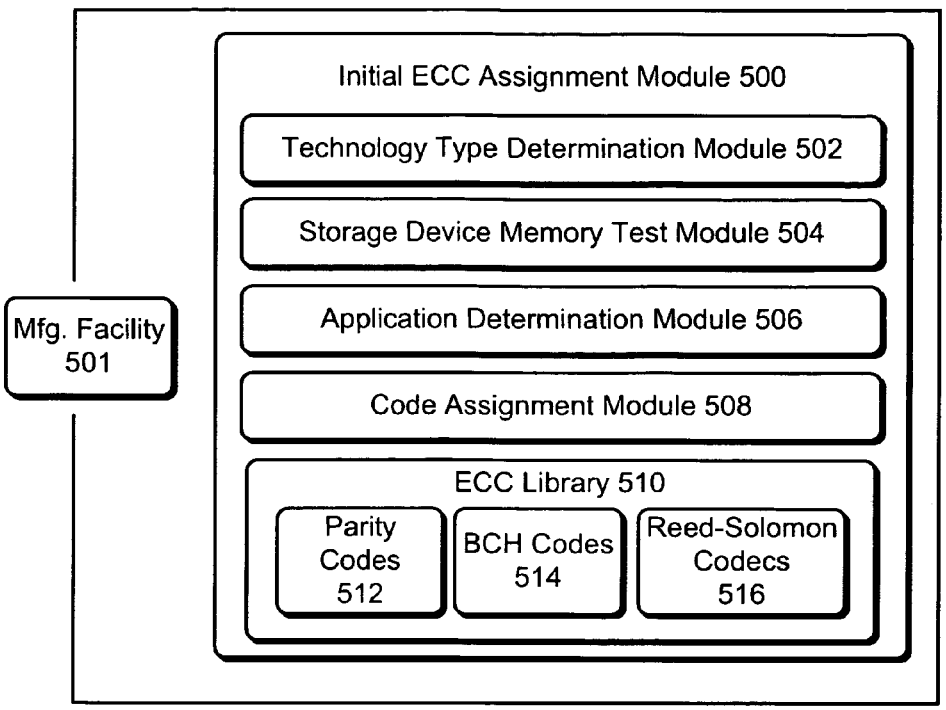
FIG. 5 is a block diagram illustrating the relationship between exemplary software structures associated with a storage device manufacturing facility supporting a dynamic variable-length error correction code.
Figure 6:
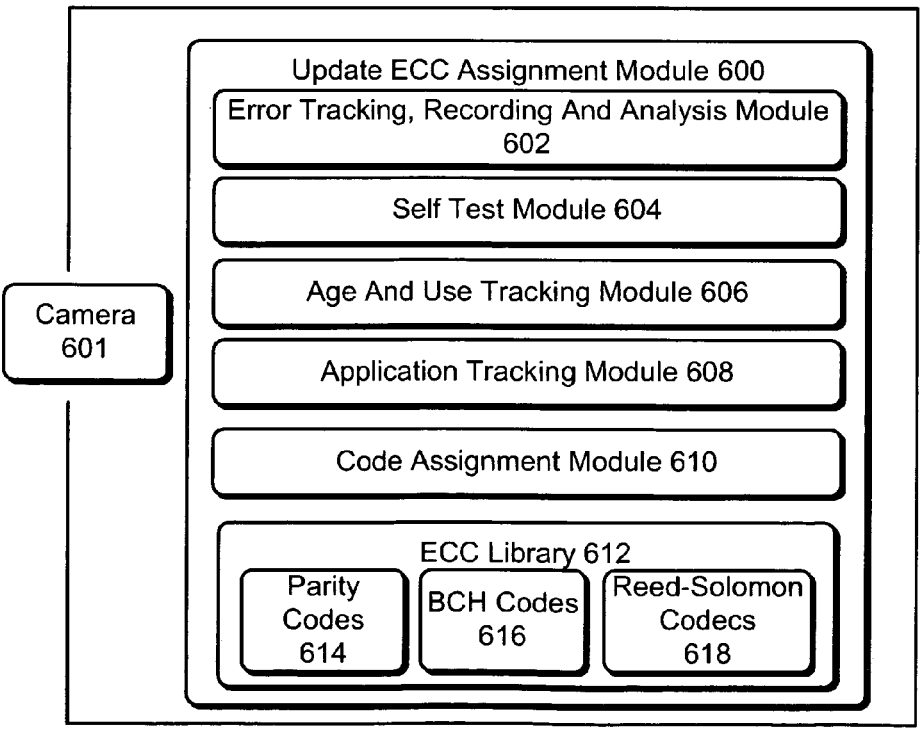
FIG. 6 is a block diagram illustrating the relationship between exemplary software structures associated with an end-use device, such as a digital camera using data storage, which supports a dynamic variable-length error correction code.

FIGS. 5 and 6 show the relationship between exemplary software modules supporting the functionality of a dynamic variable-length error correction code. The modules seen in FIGS. 5 and 6 are exemplary, and therefore could be consolidated, fragmented, or otherwise rearranged to result in similar functionality. Similarly, while suggested locations for some modules are indicated, alternate locations could be substituted. Each software module includes computer- or controller readable media having computer- or controller-readable instructions, which when executed by a controller within a device or system result in the functionality described. Hardware equivalents to the software instructions may be substituted, and may provide superior speed in some applications.

FIG. 5 shows an initial ECC assignment module 500 that is typically operational within a manufacturing facility 501 wherein the storage device 201 is manufactured. The initial ECC assignment module is adapted for initially locating the divider segregating the payload and redundancy portions of the data structure 200 associated with the storage device. Having allocated space to a redundancy portion, an assignment of an ECC is made. The assignment is based in part on an initial determination of storage device technology, a memory test, and a determination of the use or application to which the storage device will be put. During this procedure, the storage device typically is in communication with test devices contained within a manufacturing facility or is in communication with an end-use device, such as a digital camera.

A technology type determination module 502 is configured to determine the type of technology used in the memory storage device 201. For example, the technology type may be identified as Hewlett-Packard's MRAM memory. The technology type determination module may interface with the storage device or other location having knowledge of the technology type of the storage device. For example, the storage device, the manufacturing facility, or the system or device into which the storage device has been installed, such as a camera, may report to the technology type determination module 502 the type of technology used in the storage device.

A storage device memory test module 504 is configured to perform a memory test to the storage device 201. A variety of suitable memory tests are known and are therefore not described herein. The memory test determines the fundamental error rate of the storage device, as seen at 306 in FIG. 3. If memory locations of the storage device have an error rate that is unacceptably high, the test module may map them out of the address space or reject the media.

An application determination module 506 is adapted to determine the use to which the storage device 201 is to be put. Typical applications may include digital cameras and MP3 audio devices. The use to which the storage device 201 is put impacts the strength of the redundancy used. For example, where the end use device is a computer program-playing video game, the redundancy must be robust, to prevent an error from locking-up the game. Where the end use device is a music-playing device, such as an MP3 player, the redundancy may be weaker, since a dropped data packet may result only in a fractional second of inaccurate sound.

In a manufacturing facility setting, the application determination module 506 interfaces with the manufacturing facility to determine the use to which the storage device 201 is to be put. In an end-use device setting, wherein the storage device 201 is located within an end-use device, such as a digital camera, the use application determination module 506 interfaces with the end-use device to determine the use.

A code assignment module 508 is adapted to select an appropriate ECC from among those available in the ECC library 510, and also to select a level of redundancy required to accommodate information according to the code selected. The code assignment module considers the technology type as determined by module 502, the memory test results as determined by module 504, and the application as determined by module 506. Given this input, the code assignment module selects an appropriate ECC and adjusts the location of the divider 206 to provide the redundancy required to accommodate the storage of information according to the ECC selected.

The ECC library 510 typically contains a plurality of ECCs, including at least one weaker parity type code 512, at least one stronger BCH code 514, and at least one very strong Reed Solomon codecs 516. To apply one of these ECCs to the redundancy 204 associated with the data structure 200, an appropriate divider similar to divider 206 may be selected to result in the required division between the payload and redundancy in the data structure 200.

FIG. 6 shows an update ECC assignment module 600 that is particularly adapted to operate within an end-use device 601, such as a digital camera or similar. The update ECC assignment module tracks errors, monitors media age and use levels, performs self-testing and acts upon other factors relevant when evaluating memory condition and the need to install a substitute ECC. When needed, the ECC assignment module 600 selects an appropriate ECC from among those available in the ECC library. The update ECC assignment module also changes the location of a divider, thereby adjusting the amount of redundancy to accommodate information according to the newly selected ECC and maintaining the compatibility between the newly selected ECC and the space devoted to the redundancy portion of the data structure.

An error tracking, analysis and recording module 602 collects and records errors in the storage media. As errors are discovered by the redundancy, the locations of occurrence are tracked and recorded.

A self-test module 604 provides a memory test that can thoroughly test the storage device 201.

An age and use-tracking module 606 calculates the chronological age of the storage device 201 and the number of uses. Some storage technologies degrade with time and with use. By recording these factors, additional input will be available for the code update assignment module 610 to determine if a new ECC code should be installed.

A storage application-tracking module 608 interfaces with the device or system within which the storage device 201 is installed, thereby allowing it to determine the use to which the storage device is being put. For example, if the storage device were moved from a digital camera to a musical device such as an MP3 player, the storage application-tracking module would identify the change and record the information.

A code assignment module 610 is adapted to select an appropriate ECC from among those available in the ECC library 612, and to change the location of the divider 206, thereby adjusting the amount of redundancy to accommodate information according to the newly selected ECC. The code assignment module considers the error information supplied by module 602, the test results as determined by module 604, the storage device age and use information from module 606 and the application (e.g. video game, digital camera, musical MP3 player, etc.) as determined by module 608. Given this input, the code assignment module 610 selects an appropriate redundancy code.

The ECC library 612 is similar to that of 510, seen in FIG. 5. Parity codes 614, BCH codes 616 and Reed-Solomon codecs 618, or other similar ECC or redundancy codes are available.

Exemplary Method of Redundancy Allocation

Figure 7:
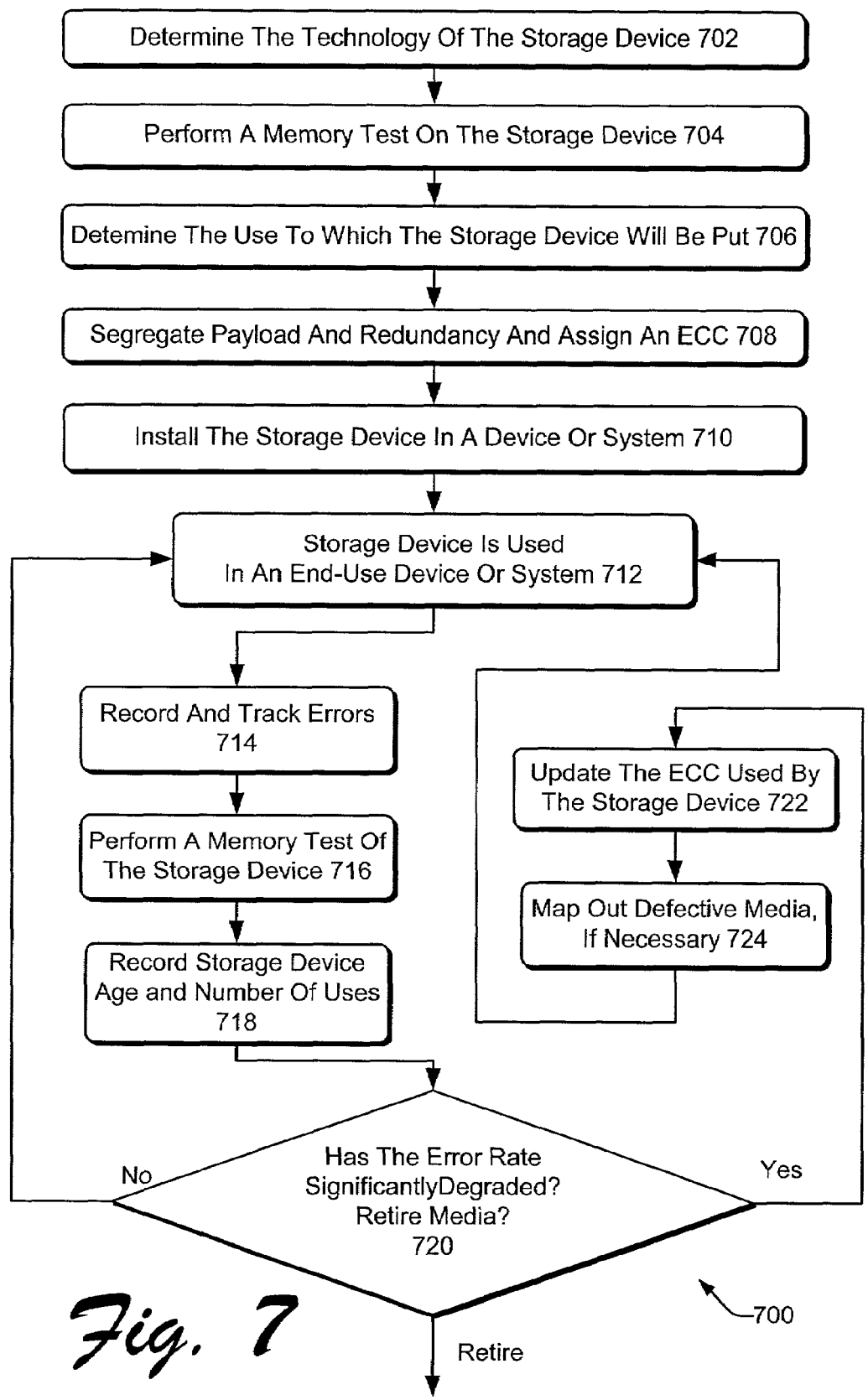
FIG. 7 is a flow diagram illustrating a method of using dynamically variable-length error correction codes.

FIG. 7 shows a method 700 by which the segregation between the payload and redundancy associated with a data structure 200 of a storage device may be initially determined, and an ECC assigned. The method is additionally adapted to dynamically alter the segregation between payload and redundancy and to allow replacement of an ECC. The replacement may be made in response to a change in the fundamental error rate of the storage device; a change in the use to which the storage device is put; a change in the age of the storage device or in the number of read/writes performed; or other change impacting reliability of the storage device. In most cases, the method 700 increases the redundancy in a manner that allows the use of stronger ECC codecs, thereby extending the useful life of the storage device. In some cases, individual blocks within the method may be skipped, when unnecessary or to facilitate faster operation.

At block 702, the technology type determination module 502 determines the technology type of the storage device. The technology of the storage device impacts the ECC required for data security.

At block 704, the storage device memory test module 504 performs a memory test on the storage device, and records the results. Following the memory test, any memory locations of inadequate reliability are mapped out of the address space or the device may be rejected.

At block 706, the use application determination module 506 determines the use to which the storage device will be put. In general, data including computer program instructions are relatively intolerant of faults; while data used to support audio and/or video output in some applications may include minor faults and still be operational.

At block 708, the code assignment module 508 selects an ECC from among those available in the ECC library 510, determines the space the redundancy will require to accommodate the ECC and makes the appropriate segregation of memory.

At block 710, the storage device is installed in a device or system, such as a camera, MP3 player or other device.

At block 712, operation of the storage device commences. In a typical application, operation of the storage device commences when the device, such as a digital camera, is turned on.

At block 714, the error tracking, analysis and recording module 602 records all errors made by the data storage device, and their time of occurrence.

At block 716, the self-test module 604 tests the memory locations of the storage device. The results of the self-test are recorded for later use.

At block 718, the age and use-tracking module 606 updates and documents data associated with time and usage. Data documented may include: the age of the storage device, in hours, days or other units; the usage of the device, including the number of hours of powered-up operation; and the activity of the device, including the number of reads and writes performed.

At block 720, the error rate information is evaluated, in general to determine if the error rate has significantly increased or the application to which the storage device is used has changed, and in particular to determine if an alternative ECC is required. Where the error rate is generally constant, the storage device is reused, at block 712. Where the error rate has increased beyond a threshold value, the ECC is updated at block 722. Where the error rate has increase beyond a manageable rate, the media is retired from use.

At block 722, the code update assignment module 610 evaluates the current redundancy, and decides if a more appropriate redundancy should be substituted, due to changing conditions. If so, an ECC with the appropriate strength is selected. The divider between the payload and redundancy in the data structure of the storage device is moved, to result in the sufficient redundancy to allow use of the newly selected ECC.

At block 724, if necessary, defective memory locations are mapped out of the device's address space.

CONCLUSION

Using error tracking, memory testing and other means, the appropriateness of the error correction code used in the redundancy defined within a data structure associated with a storage device may be evaluated. Where an increase in the error rate indicates, the data structure may be altered dynamically to reallocate memory between payload and redundancy. For example, the memory space devoted to payload may be decreased, and the memory space devoted to redundancy increased, thereby allowing the substitution of a more robust error correcting code.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A method, comprising:
    associating an initial error correcting code with a redundancy defined within a data storage device; and
    replacing the initial error correcting code with an updated error correcting code.

2. The method of claim 1, additionally comprising moving a divider, defined between the redundancy and a payload, to provide space required by the updated error correcting code within the redundancy.

3. The method of claim 1, additionally comprising reorganizing an address space shared by a payload and the redundancy to provide space required by the updated error correcting code within the redundancy.

4. The method of claim 1, additionally comprising performing a memory test on the data storage device to determine if the initial error correction code is of sufficient strength.

5. The method of claim 1, additionally comprising tracking errors made by the data storage device to determine if the initial error correction code is of sufficient strength.

6. The method of claim 1, additionally comprising tracking time and usage of the data storage device to determine if the initial error correction code is of sufficient strength.

7. A method comprising:
    defining a payload and a redundancy within a storage device, the payload to the payload plus redundancy defining a ratio;
    dynamically altering the ratio to change an amount of the redundancy;
    tracking time and usage of the data storage to determine if the ratio results in sufficient redundancy.

8. The method of claim 7, additionally comprising:
    performing a memory test on the data storage device to determine if the ratio results in sufficient redundancy.

9. The method of claim 7, additionally comprising:
    tracking errors made by the data storage device to determine if the ratio results in sufficient redundancy.

10. A system, comprising:
    a technology type determination module to report a technology of a storage device so that an initial error correcting code will be more appropriately selected;
    an update error correcting code assignment module to assign an updated error correcting code to replace the initial error correcting code in response to a changed error rate; and
    an error correcting code library containing at least two error correcting codes from which the update error correcting code assignment module may select.

11. The system of claim 10, additionally comprising an initial error correcting code assignment module to assign the initial error correcting code in response to an initial error rate.

12. The system of claim 10, additionally comprising a storage device memory test module to perform a memory test on a storage device and report to the update error correcting code assignment module.

13. The system of claim 10, additionally comprising an application determination module to determine an application to which a storage device will be put and to report to the update error correcting code assignment module.

14. The system of claim 10, additionally comprising an error tracking, recording and analysis module, to report information on errors made by a storage device to the update error correcting code assignment module.

15. The system of claim 10, additionally comprising an age and use tracking module to report information on an age and use level of a storage device to the update error correcting code assignment module.

16. A system, comprising:
    an ECC library, containing at least two error correcting codes;
    an initial error correcting code assignment module to assign an initial error correcting code from the ECC library appropriate to an expected initial error rate;
    a technology type determination module to determine a technology of a storage device and to report the technology to the initial error correcting code assignment module;
    an application determination module to determine an application to which the storage device will be put and to report to the initial error correcting code assignment module;
    an update error correcting code assignment module to assign an updated error correcting code from the ECC library appropriate in response to a changed error rate;
    a storage device memory test module to perform a memory test on the storage device and report to the update error correcting code assignment module so that a decision to assign an updated error correcting code may be made;

an error tracking, recording and analysis module to report information on errors made by the storage device to the update error correcting code assignment module so that a decision to assign an updated error correcting code may be made;

an age and use tracking module to report information on an age and use level of the storage device to the update error correcting code assignment module so that a decision to assign an updated error correcting code may be made; and an application tracking module to report changes in an application to which the storage module is being used to the update error correcting code assignment module so that a decision to assign an updated error correcting code may be made.

17. A computer-readable medium having computer-executable instructions thereon which, when executed, perform acts comprising:

associating an initial error correcting code with a redundancy defined within a data storage device;

associating an updated error correcting code with the redundancy in response to a change in an error rate associated with the data storage device; and moving a divider, defined between the redundancy and a payload within the data storage device, to provide space required by redundancy data associated with the updated error correcting code.

18. A computer-readable medium having computer-executable instructions thereon which, when executed, perform acts comprising:

monitoring an error rate of a storage device; and dynamically altering a ratio of a redundancy to a payload to provide a level of redundancy appropriate to the error rate.

19. A method of initial error code correction assignment at a manufacturing facility, comprising:

locating a divider segregating a payload and a redundancy portion of a data structure in a storage device;

allocating the redundancy portion by moving the divider;

assigning an initial error code correction to the redundancy portion.

20. The method of claim 19 wherein the initial error code correction is assigned based at least in part on an initial determination of storage device technology, a memory test, and a determination of use to which the storage device will be put.

21. A method of updating an error code correction assignment for an end-use device, comprising:

determining a need to install a substitute error code correction assignment for the end-use device;

selecting the substitute error code correction assignment on an as-needed basis;

changing the location of a divider to accommodate the substitute error code correction for the end-use device, wherein determining a need to install a substitute error code correction assignment includes tracking errors, monitoring media age and use levels, and performing self-testing to evaluate memory condition for the end-use device.

22. A method of determining an initial segregation between a payload and redundancy associated with a data structure of a storage device, comprising:

determining a technology type of the storage device;

performing a memory test on the storage device and recording a result of the memory test;

determining a use to which the storage device will be put;

selecting an error code correction based on the determinations and memory test;

segregating the data structure to accommodate the error code correction.

23. The method of claim 22 further comprising:

evaluating information corresponding to an error rate to determine if the error rate has increased;

reusing the storage device if the error rate is substantially constant; and updating the error correction code if the error rate has increased beyond a threshold value.

* * * * *

UNITED STATES PATENT AND TRADEMARK OFFICE
CERTIFICATE OF CORRECTION

PATENT NO. : 6,961,890 B2  
APPLICATION NO. : 09/931776  
DATED : November 1, 2005  
INVENTOR(S) : Kenneth Kay Smith Page 1 of 1

It is certified that error appears in the above-identified patent and that said Letters Patent is hereby corrected as shown below:

In column 10, line 1, in Claim 7, after "method" insert -- , --.

In column 10, line 7, in Claim 7, after "storage" insert -- device --.

Signed and Sealed this

Twenty-seventh Day of October, 2009

David J. Kappos  
*Director of the United States Patent and Trademark Office*